(12) United States Patent
Becheret et al.

(10) Patent No.: US 12,710,441 B2
(45) Date of Patent: Aug. 18, 2026

(54) METHOD FOR LIMITING BARO-INERTIAL SPEED CORRECTION AND ASSOCIATED SYSTEM

(71) Applicant: SAFRAN ELECTRONICS & DEFENSE, Paris (FR)

(72) Inventors: Yves Becheret, Moissy Cramayel (FR); Loïc Davain, Moissy Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 237 days.

(21) Appl. No.: 18/712,145

(22) PCT Filed: Nov. 22, 2022

(86) PCT No.: PCT/FR2022/052155
§ 371 (c)(1),
(2) Date: May 21, 2024

(87) PCT Pub. No.: WO2023/094763
PCT Pub. Date: Jun. 1, 2023

(65) Prior Publication Data

US 2025/0027969 A1 Jan. 23, 2025

(30) Foreign Application Priority Data

Nov. 26, 2021 (FR) ...................................... 2112605

(51) Int. Cl.
*G01P 3/62* (2006.01)
*G01C 5/06* (2006.01)
*G01C 21/16* (2006.01)

(52) U.S. Cl.
CPC .................. *G01P 3/62* (2013.01); *G01C 5/06* (2013.01); *G01C 21/165* (2013.01)

(58) Field of Classification Search
CPC .. G01P 3/62; G01C 5/06; G01C 21/16; G01C 21/165
See application file for complete search history.

(56) References Cited

U.S. PATENT DOCUMENTS 4,882,697 A 11/1989 Ross
6,492,934 B1 * 12/2002 Hwang ................. G01C 5/005 701/4

(Continued)

OTHER PUBLICATIONS

International Search Report as issued in International Patent Application No. PCT/FR2022/052155, dated Feb. 17, 2023.

(Continued)

*Primary Examiner* — Erika J. Villaluna
(74) *Attorney, Agent, or Firm* — CUSHMAN PARTNERS, LLC

(57) ABSTRACT

A method for limiting baro-inertial vertical speed correction, baro-inertial vertical speed being calculated by a baro-inertial loop implemented by a processor included in an airborne system further including an accelerometer and a barometric altimeter, the loop taking a vertical acceleration and a barometric altitude as input and being configured so as: to provide at least one altitude and the vertical speed; to correct the altitude and the vertical speed on the basis of the barometric altitude, a position correction gain, a vertical speed correction gain and a vertical acceleration correction gain. The method includes limiting vertical speed correction when the absolute value of the difference between the barometric altitude and the altitude exceeds a predetermined threshold, the limiting vertical speed correction including modification of the position correction gain.

12 Claims, 3 Drawing Sheets

(56) References Cited

U.S. PATENT DOCUMENTS

| | | | | |
|---|---|---|---|---|
| 7,970,501 | B2 * | 6/2011 | Kirkland .............. | G01C 21/005 340/978 |
| 2003/0233175 | A1 | 12/2003 | Giraudy et al. | |
| 2015/0006020 | A1 | 1/2015 | D'Arbonneau | |

OTHER PUBLICATIONS

Ausman, J. S., et al,. "Baro-Inertial Loop for the USAF Standard RLG INU," Navigation: Journal of the Institute of Navigation, Institute of Navigation, vol. 38, No. 2, Sep. 1991 pp. 205-220, XP056013096.

* cited by examiner

Prior Art

METHOD FOR LIMITING BARO-INERTIAL SPEED CORRECTION AND ASSOCIATED SYSTEM

CROSS-REFERENCE TO RELATED APPLICATIONS

This application is the U.S. National Stage of PCT/FR2022/052155, filed Nov. 22, 2022, which in turn claims priority to French patent application number 2112605 filed Nov. 26, 2021. The content of these applications are incorporated herein by reference in their entirety.

TECHNICAL FIELD OF THE INVENTION

The technical field of the invention is that of metrology for aiding in vertical positioning of airborne systems.

The present invention relates to a method for limiting baro-inertial speed correction and in particular baro-inertial speed correction within a baro-inertial loop by modifying a vertical position correction gain value.

TECHNOLOGICAL BACKGROUND OF THE INVENTION

Airborne systems need reliable vertical positioning data. By 'vertical positioning' it is meant any type of vertical information, for example altitude, vertical speed or vertical acceleration.

To meet this need for reliable positioning data, these systems carry a plurality of sensors for positioning, together or taken alone, the airborne system. Each of these sensors is used to obtain, correct and/or confirm the positioning information.

In a known way, the plurality of sensors is integrated into an inertial system or an AHRS (Attitude and Heading Reference System). An inertial system comprises at least acceleration and rotation sensors to determine the movement relative to the Earth of the system in which it is installed, after an initialisation phase. An AHRS also makes use of measurements of the magnetic field and air speed with calculation means in order to compile information about its attitude relative to the Earth and to maintain its location.

In an inertial system such as an AHRS, as altitude and vertical speed are obtained by continuous integration of the vertical component of the acceleration deduced from accelerometers and the attitude measured by the accelerometer, the slightest error in acceleration is accumulated and amplified by the integration to obtain the vertical speed and by the double integration to obtain the altitude. To compensate for this, airborne systems carry additional sensors to correct these errors. For example, aircraft typically carry a baro-altimeter to obtain a pressure difference between a reference altitude and the altitude of the baro-altimeter. Information obtained from the baro-altimeter is used by a processor to continuously correct vertical error of the accelerometer. This processor uses a digital loop called the baro-inertial loop.

A known baro-inertial loop is schematically represented in FIG. 1. Adders/subtractors are represented by circles comprising a cross. Integrators are represented by triangles. A specific vertical force F_specZ is calculated by an inertial navigation system INS or an AHRS from data provided by an accelerometer A. This is schematically represented by the arrow between accelerometer A and the adder of the INS/AHRS. The INS or AHRS thus provides the baro-inertial loop with an estimated vertical acceleration γZ, based on the vertical specific force F_speZ and on the local gravity g_est estimated by the calculation function C1, a decreasing function of the gradient altitude approximately-2 g/R (with R the mean Earth radius, g approximately 9.81 m/s$^2$ slightly variable with the position on Earth at H=0). This gives the vertical acceleration γZ to within the effects of compensated gravity, accelerometer and attitude errors.

This vertical acceleration information γZ is integrated a first time by integrator I1 to obtain a vertical speed Vzbi and then a second time by integrator I2 to obtain a vertical position (altitude) Zbi. To improve accuracy of the values obtained, the calculation function C1 calculates gravity and Coriolis acceleration from the altitude Zbi, which is added to the vertical specific force F_speZ from the accelerometer. This loop (the upper one in the schematic representation in FIG. 1) will be referred to as the 'inertial loop'. As previously indicated, as this inertial loop is based solely on accelerometer measurements, measurement errors accumulate and the values obtained are unstable.

Known baro-inertial loops thereby comprise servocontrol of the altitude integrated from inertial measurements to an altitude measured by a baro-altimeter with an order-3 corrector. The baro-inertial loop of FIG. 1 therefore comprises as an input an additional pressure difference measurement from a baro-altimeter. This 'pressure altitude' is provided as an input to the block 'BA'. It is compared with the altitude Zbi from the inertial loop and this difference is sent back to different points in the inertial loop.

In the lower loop (in FIG. 1), which will be referred to as the correction loop, three corrections are estimated:

- An altitude correction at the loop K1, via the gain K1, which enables the altitude Zbi obtained by double integration of the vertical acceleration from the pressure altitude to be corrected fairly quickly,
- A vertical speed correction in loop K2, via gain K2,
- A vertical acceleration correction at loop K3, via gain K3 and integrator I3. Permanent speed correction indeed implies an acceleration error. The loop K3 corrects the acceleration, which avoids having to correct the speed permanently, and avoids having a permanent speed bias due to an acceleration error. This acceleration correction compensates for errors due to:
  - The accelerometer measuring inertial acceleration, this error being mainly due to the accelerometer bias(es),
  - The characteristics of the layer of atmosphere actually encountered during the flight,
  - and the difference between the apparent gravity value calculated by calculation function C1 and used in the baro-inertial loop and the actual local apparent gravity.

The correction loop is an order-3 corrector comprising three gains K1 to K3. These gains are predetermined as a function of the anemometric chain of the airborne system carrying the baro-inertial loop. These gains can be a function, for example, of maximum errors, error overshoot and desired convergence speeds. Particular restrictions apply, for example, to airborne systems that manoeuvre very strongly in vertical axis, implying gains K1 to K3 that are different from the gains K1 to K3 used for civil commercial aeroplanes. Generally speaking, whatever the aircraft, there is a relationship between these different coefficients, as described in the following paragraph.

A constant t is defined which corresponds to the response time of the baro-inertial loop. From this response time, the coefficients K1, K2, K3 can be deduced as follows, the choice of coefficient τ depending on the aircraft and other operational requirements:

$$K1 = \frac{3}{\tau}$$

$$K2 = \frac{3}{\tau^2}$$

$$K3 = \frac{1}{\tau^3}$$

These gains are multiplied by the difference between the barometric altitude BA and the baro-inertial vertical position Zbi or by this difference integrated by the integrator I3. These corrections resulting from the multiplication of each gain with the difference between the barometric altitude BA and the baro-inertial vertical position Zbi or with this difference integrated by the integrator I3 are added at different places in the 'upper' inertial loop. For example, the correction resulting from the multiplication of the gain K1 with the difference between barometric altitude BA and baro-inertial vertical position Zbi is added the baro-inertial speed Vzbi, before integrator I2. The correction resulting from the multiplication of gain K2 with the difference between barometric altitude BA and baro-inertial vertical position Zbi is added to acceleration Acc, before integrator I1 and the correction resulting from the multiplication of gain K3 with the difference between barometric altitude BA and baro-inertial vertical position Zbi integrated by I3 is also added to acceleration Acc, before integrator I1.

A problem arises when an airborne system carrying a baro-inertial loop, a baro-altimeter BA and an accelerometer A, approaches the ground. A downwash effect, mainly present when the airborne system is a helicopter, locally increases the pressure as the airborne system approaches the ground. The baro-altimeter BA then notices a very rapid increase in pressure. As a result, the barometric altitude Zba is modified as represented in FIG. 2A. FIG. 2B shows the difference between the baro-inertial vertical position Zbi and the barometric altitude Zba. As the barometric altitude Zba is used to correct the baro-inertial speed Vzbi produced by the baro-inertial loop, the baro-inertial speed Vzbi exhibits transient errors of up to 1000 feet per minute during these error variation phases. When a helicopter lands on sand or snow, for example, this can pose a problem, as landing becomes complex because it is mainly based on the vertical speed Vzbi produced by the baro-inertial loop. This problem also arises when flying over cliffs, where there is a rapid change in pressure, even though the absolute altitude has not been modified.

In addition, the vertical speed Vzbi produced by the baro-inertial loop is affected by large initial baro-inertial altitude errors, for example in the case of a simple initial altitude set to 0. The time taken to go below an error of 300 feet per minute depends on the initialisation error of the baro-inertial altitude Zbi and this time may be considered too high in relation to a need for rapid validity of the baro-inertial speed Vzbi after power-up.

There is therefore a need to be able to correct a significant variation in baro-inertial speed due to a significant increase in barometric altitude.

SUMMARY OF THE INVENTION

The invention offers a solution to the problems previously discussed, by making it possible, by modifying the vertical position correction, to limit changes in baro-inertial speed within a baro-inertial loop due to transient barometric altitude errors.

One aspect of the invention therefore relates to a method for limiting baro-inertial vertical speed correction, the baro-inertial vertical speed being calculated by a baro-inertial loop, the baro-inertial loop being implemented by at least one processor included in an airborne system, the airborne system further comprising at least one accelerometer and at least one baro-altimeter, the baro-inertial loop taking as an input at least one vertical acceleration originating from at least one measurement of the accelerometer and at least one barometric altitude originating from at least one measurement of the baro-altimeter, the baro-inertial loop being configured to:

- provide, from the vertical acceleration, at least one baro-inertial vertical position and the baro-inertial vertical speed
- correct the baro-inertial vertical position and the baro-inertial vertical speed from the barometric altitude and at least one position correction gain, at least one vertical speed correction gain and at least one vertical acceleration correction gain,
- the baro-inertial vertical position undergoing a modification due to a modification in the barometric altitude, the modification in the barometric altitude being due to a modification in local pressure, the method being implemented by the processor implementing the baro-inertial loop and being characterised in that it comprises at least one step of limiting correction of the baro-inertial vertical speed when the absolute value of the difference between the barometric altitude and the baro-inertial vertical position is greater than a predetermined threshold, the step of limiting correction of the baro-inertial vertical speed comprising modifying the position correction gain.

By virtue of the invention, it is possible to limit baro-inertial speed corrections by quickly correcting, in a way that is simple to implement, transient baro-inertial altitude errors calculated by the baro-inertial loop. These errors occur, for example, when the carrier is at a constant altitude, but the baro-altimeter wrongly measures a variation in altitude. The rapid correction according to the invention makes it possible to limit impact of this transient altitude error on the baro-inertial speed calculated. This correction is implemented at the baro-inertial position correction gain. By acting on the baro-inertial position correction gain as a function of the difference between the barometric altitude Zba from the baro-altimeter and the baro-inertial vertical position Zbi from the baro-inertial loop, the transient baro-inertial altitude error does not have time to have an impact on the baro-inertial vertical speed Vzbi correction. Thus, at constant true vertical speed, the estimated baro-inertial vertical speed Vzbi is kept constant or is only slightly modified because the altitude error is rapidly corrected, so the baro-inertial vertical speed correction is limited.

The invention makes it possible, for example, to increase the baro-inertial position correction gain when the difference between the barometric altitude and the baro-inertial vertical position is greater than a threshold, resulting in a greater baro-inertial position correction than would conventionally have been achieved by the baro-inertial loop. If this difference is greater than a threshold, the local pressure, i.e. at the system carrying the equipment of the invention, has been significantly rapidly modified. A more significant correction of the baro-inertial position thus makes it possible to limit the baro-inertial speed correction which would have had to be applied because of this significant and rapid modification in local pressure, the purpose of the invention being to quickly correct the vertical position without modifying the vertical speed.

The invention especially makes it possible to limit the baro-inertial vertical speed correction Vzbi on helicopters in cases of rapid ground effect passage, or in cases of flying over cliffs, thus making it possible to maintain a vertical speed as close as possible to the true vertical speed.

It also makes it possible to improve robustness of the baro-inertial loop start-up by reducing the time required to comply with the baro-inertial vertical speed Vzbi accuracy with an incorrect but simple initialisation, for example 0 m, of the initial altitude in the baro-inertial loop. The transient if the start-up is carried out at 4000 m with the standard loop is then very high and the invention makes it possible to correct this problem.

By 'correction limitation', it is meant a reduction in the correction of the baro-inertial speed by the gain K2 which should have taken place if the correction of the baro-inertial position had not been modified. By 'correction' is meant the reduction of transient errors in the baro-inertial vertical speed Vzbi from the baro-inertial loop, an error being a change in the baro-inertial vertical speed Vzbi while the true vertical speed is not modified, or a significant modification in the baro-inertial vertical speed Vzbi while the true vertical speed is little changed.

Further to the characteristics just discussed in the previous paragraph, the correction limiting method according to one aspect of the invention may have one or more additional characteristics from among the following, considered individually or according to any technically possible combinations:

- modifying the position correction gain comprises multiplying the position correction gain by a predetermined factor greater than 1,
- the predetermined threshold is between 3 and 9 metres, preferably 7 metres, and the predetermined factor is between 2 and 4, preferably 3,
- the predetermined threshold is a function of the baro-inertial altitude,
- the position correction gain modification is carried out only if the baro-inertial altitude is less than or equal to a predetermined altitude threshold,
- the baro-inertial vertical speed correction limiting step further comprises modifying the speed correction gain and modifying the acceleration correction gain,
- modifying the speed correction gain comprises multiplying the speed correction gain by a first predetermined factor less than 1 and modifying the acceleration correction gain comprises multiplying the acceleration correction gain by a second predetermined factor less than 1.

Another aspect of the invention relates to an airborne system comprising at least:

- a baro-altimeter,
- an accelerometer and
- a processor implementing a baro-inertial loop, the baro-inertial loop taking as an input at least one vertical acceleration from at least one measurement of the accelerometer and at least one barometric altitude from at least one measurement of the baro-altimeter, the baro-inertial loop being configured to:
  - provide, from the vertical acceleration, at least one vertical position and at least one vertical speed
  - correct the vertical position and the vertical speed from the barometric altitude and at least one position correction gain, at least one vertical speed correction gain and at least one vertical acceleration correction gain,
- the baro-inertial vertical speed undergoing a modification due to a modification in the barometric altitude, the modification in the barometric altitude being due to a modification in local pressure,
- the system being characterised in that the processor is configured to implement the method for limiting the baro-inertial vertical speed correction according to the invention.

Another aspect of the invention relates to a computer program product comprising instructions which, when the program is executed by a computer, cause the same to implement the method according to the invention.

Another aspect of the invention relates to a computer-readable recording support comprising instructions which, when executed by a computer, cause the same to implement the method according to the invention.

The invention finds a particularly interesting application in aircraft when flying close to the ground, when flying over cliffs or upon initialising the baro-inertial loop.

The invention and its different applications will be better understood upon reading the following description and upon examining the accompanying figures.

BRIEF DESCRIPTION OF THE FIGURES

The figures are set forth by way of indicating and in no way limiting purposes of the invention.

DETAILED DESCRIPTION

Unless otherwise specified, a same element appearing in different figures has a single reference.

Figure 1:
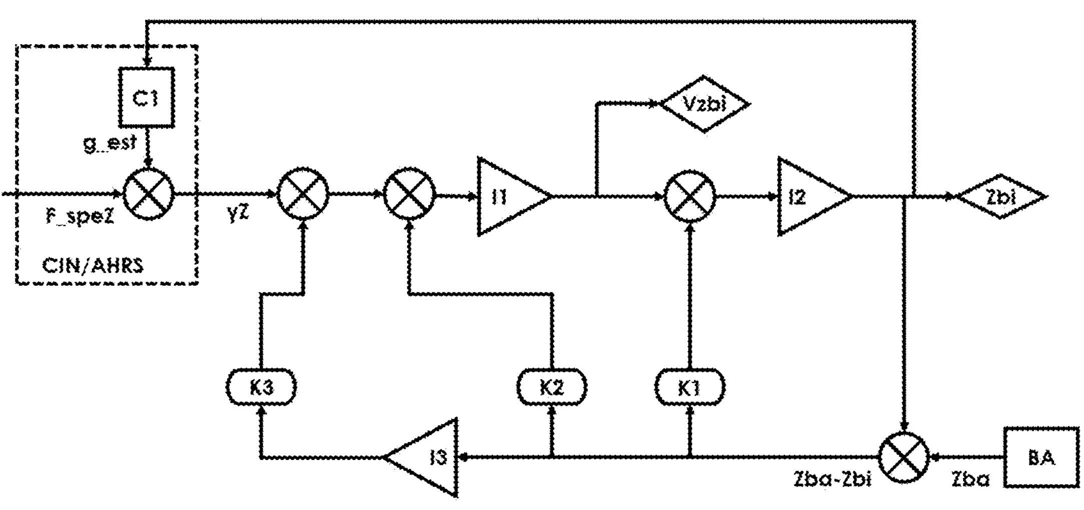
FIG. 1 shows a schematic representation of a known baro-inertial loop.
Figure 2A:
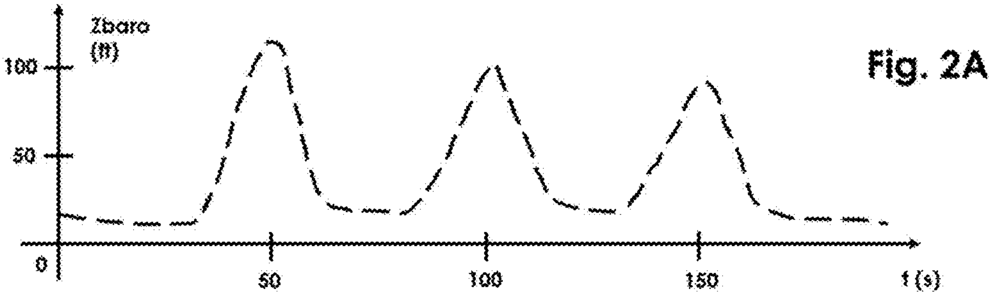
FIGS. 2A and 2B show transient altitude errors in ground effect.
Figure 2B:
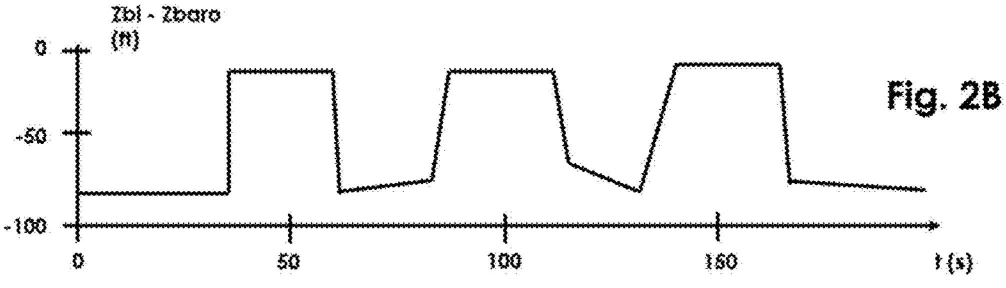
Figure 3:
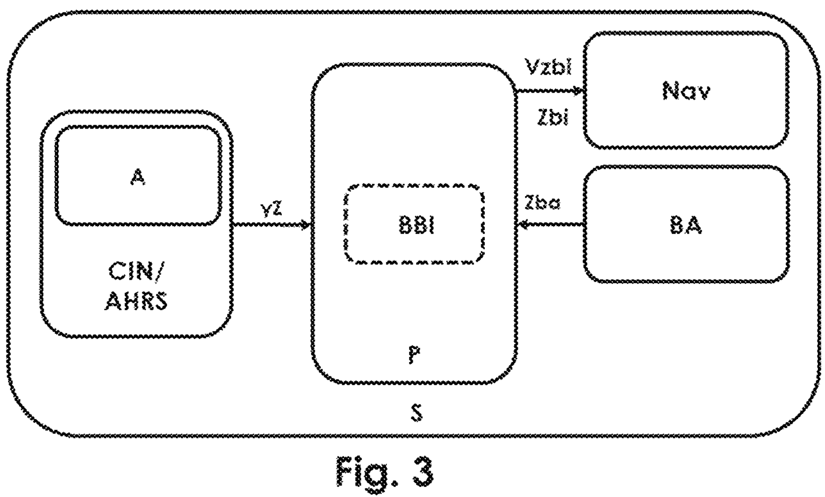
FIG. 3 shows a schematic representation of a system implementing the method according to the invention.

FIG. 3 shows a schematic representation of a system implementing the baro-inertial speed correction limitation method according to the invention.

A system for implementing the invention comprises at least one baro-altimeter BA, a processor P and a navigation system INS or an AHRS, comprising at least one accelerometer A. The system S in FIG. 3 also comprises a navigation system Nav.

A specific vertical force F_speZ is calculated from data from the accelerometer A and the attitude relative to the horizontal (synchronous) maintained by the INS (inertial navigation system) or the AHRS. The baro-altimeter BA is configured to provide at least one barometric altitude piece of data Zba to the processor P. The processor P implements a baro-inertial loop BBI and is configured to implement the baro-inertial vertical speed correction limitation method according to the invention. Optionally, when the system S comprises the navigation system Nav, the processor P is further configured to transmit to the navigation system Nav at least one baro-inertial vertical speed piece of data Vzbi from the baro-inertial loop BBI and/or at least one baro-inertial vertical position piece of data Zbi from the baro-inertial loop BBI.

System S is an airborne system, i.e. it is transported by air, by being carried by a device or system with the ability to navigate by air, such as an aircraft, for example an aeroplane or a helicopter. The invention covers cases where the different components of system S are carried by the same airborne device and/or system. It is necessary for at least the accelerometer A and the baro-altimeter BA to be included in the same airborne device and/or system.

Figure 4:
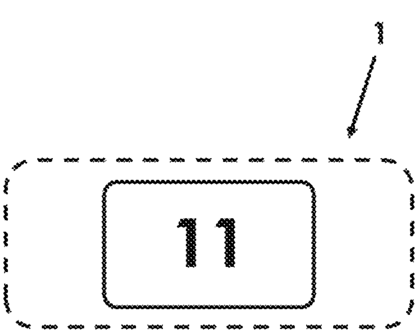
FIG. 4 shows a schematic representation of the method according to the invention.

The processor P is configured to implement the baro-inertial speed correction limitation method according to the invention. FIG. 4 shows a schematic representation of the method 1 for limiting baro-inertial speed correction according to the invention.

Figures 5, 6:
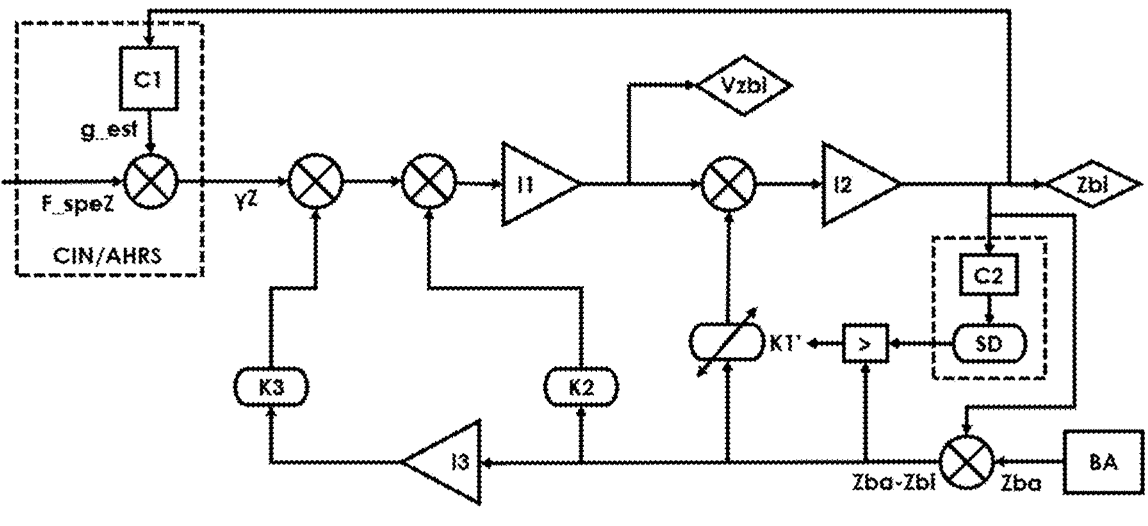
FIG. 5 shows a schematic representation of a baro-inertial loop modified according to a first embodiment of the invention.
FIG. 6 shows a schematic representation of a baro-inertial loop modified according to a second embodiment of the invention.

The corrected baro-inertial speed is the vertical speed Vzbi at the output of the baro-inertial loop BBI, as represented in FIG. 5, which shows a schematic representation of a baro-inertial loop BBI to implement the method according to the invention. The baro-inertial loop BBI is a digital loop, implemented by the processor P. To implement the baro-inertial loop BBI, the system S further comprises a memory (not represented) storing instructions which, when executed by the processor P, cause the processor P to implement the baro-inertial loop BBI.

The baro-inertial loop BBI of FIG. 5 is substantially a conventional baro-inertial loop, modified with respect to a conventional baro-inertial loop in that the gain K1 is replaced by a variable gain K1'. The gain K1 is a baro-inertial vertical position correction gain Zbi. The variable gain K1' is therefore also a baro-inertial vertical position correction gain Zbi. It is used before the integration, with the integrator I2, of the speed Zbi in the 'upper' inertial loop. It therefore quickly acts on the baro-inertial vertical position Zbi from the baro-inertial loop BBI, as it is added towards the end of the 'upper' inertial loop of the baro-inertial loop BBI. This correction also affects the baro-inertial speed Vzbi since the baro-inertial vertical position Zbi is re-used by the 'lower' corrective loop with gains K2 and K3. The gains K1 to K3 can, for example, take values of the orders of magnitude K1=0.16, K2=0.007 and K3=0.000120, for a loop time constant at altitude of 6 seconds. By increasing the position correction gain K1, for example to 0.32 with a factor of 2 for the previously described values, the correction of the baro-inertial vertical position Zbi is accelerated, by limiting the speed and acceleration correction, as the loop is not given time to correct the speed. Thus, the baro-inertial vertical position Zbi is modified, thereby limiting the speed correction applied at the loops K2 and K3.

The method 1 for limiting baro-inertial speed correction according to the invention thus comprises at least one step 11 for limiting the correction of the baro-inertial vertical speed Vzbi when the absolute value of the difference between the barometric altitude Zbaro and the baro-inertial vertical position Zbi is greater than a predetermined threshold SP.

This step 11 comprises modifying the position correction gain K1 when the difference between Zba and Zbi is greater than the predetermined threshold SP. Indeed, if the local pressure value has been modified quickly and fairly significantly, the absolute value of the difference between Zba and Zbi is greater than the predetermined threshold SP. Thus this indicator shows when it is necessary to limit the speed correction. It is therefore necessary to choose a threshold SP to ensure that the difference between Zba and Zbi is linked to this change in local pressure. For this, the threshold SP is chosen to be greater than between 95% and 99% of the differences in normal flight and in climb-descent excluding rapid ground effect on the airborne system carrying the airborne system S. Thus, a predetermined threshold SP may be fixed, for example between 10 and 30 feet, i.e. between approximately 3 and 9 metres. Preferably, a fixed predetermined threshold SP of approximately 7 metres is chosen, corresponding to a value greater than 23 feet (7.0104 metres).

In an alternative of the invention represented in FIG. 5, the threshold can be dynamically determined as a function of the baro-inertial vertical position Zbi. Indeed, the standard deviation of the quasi-constant pressure measurement noise in metres varies according to a typical law corresponding to the inverse of the relative variation in density of the atmosphere as a function of altitude. With the standard law of the atmosphere, a threshold adaptation coefficient with respect to a setting at 0 m, i.e. 1013 HPa, can be approximated by an order-2 polynomial function increasing as a function of the baro-inertial vertical position Zbi, with a value of 1 at Zbi=0. This is achieved by the calculation function C2, to obtain the dynamic threshold SD. In the remainder of the description, the predetermined threshold and the dynamic threshold SD will be one and the same.

When the absolute value of the difference |Zba-Zbi| between the barometric altitude Zba and the baro-inertial vertical position Zbi from the baro-inertial loop BBI is greater than the threshold, correction limiting step 11 is implemented and comprises modifying the position correction gain K1 to a modified gain K1'. This modifying preferably comprises multiplying the gain K1 by a predetermined factor. This factor is chosen, for example, between 2 and 4, preferably 3. Thus, to the correction K1*(Zba-ZBI) is added an additional correction of for example (Fac−1)*K1* (Zba−ZBI), with Fac the factor chosen, when the absolute value of (Zba-ZBI) exceeds the threshold. It may also be considered that the gain K1 is multiplied by the factor Fac. The correction Fac*K1*(Zba-Zbi) is added to the speed Vzbi before integration by the integrator I2, as shown in the baro-inertial loop of FIG. 5. In one alternative, gain modifications in the event of the predetermined or dynamic threshold SD being exceeded are only applied if the baro-inertial altitude Zbi is less than or equal to a predetermined altitude threshold, for example an altitude threshold chosen between 5000 and 8000 m, as there is no possible ground effect above this limit (according to the use and capabilities of the apparatus).

Increasing the gain K1 reduces the associated time constant but increases the sensitivity of the baro-inertial vertical position Zbi to measurement noise. A permanent increase in this gain K1 would therefore affect the noise of the baro-inertial vertical position Zbi. Thus, in the invention, the gain K1 is only modified when a threshold is exceeded. It should be noted that the maximum gain usable for the correction gain K1 is limited by the need for stability of the baro-inertial loop BBI with the delays and calculation rates of the looping calculations, typically 100 Hz in systems S using inertial navigation systems.

The invention makes it possible to limit baro-inertial vertical speed Vzbi transient errors, wholly or partially, as a function of the multiplier factor of the gain K1 chosen. The threshold makes it possible to select sensitivity for triggering the correction and therefore for modifying the gain K1.

In another embodiment of the invention, the speed correction coefficient K2 and the acceleration correction coefficient K3 are also modified at step 11 of limiting the speed correction. This is represented in FIG. 6, which shows a modification in the gains K2 and K3 in addition to the modification in the gain K1. The gains K2 and K3 are not modified in the same way as the gain K1 in that they are multiplied by a factor less than 1. Thus the gains K2 and K3 are reduced when the difference between Zba and Zbi is greater than the predetermined or dynamic threshold SD. The factor used to reduce the gains K2 and K3 may be the same for K2 and for K3 or may be different for each of the two gains. The correction gains for speed K2 and acceleration K3 may, for example, be divided by 2, 3 or 4. This second embodiment makes it possible to further limit the baro-inertial speed correction and therefore to reduce the baro-inertial speed error linked to an erroneous modification in the barometric altitude. In an alternative to this second embodiment, the speed correction gains K2 and/or acceleration correction gains K3 are cancelled, i.e. they are assigned a zero value, which makes it possible to eliminate speed correction when the difference between Zba and Zbi is greater than the predetermined or dynamic threshold SD.

The invention claimed is:

1. A method for limiting baro-inertial vertical speed correction, the baro-inertial vertical speed being calculated by a baro-inertial loop, the baro-inertial loop being implemented by at least one processor included in an airborne system, the airborne system further comprising at least one accelerometer and at least one baro-altimeter, the baro-inertial loop taking as an input at least one vertical acceleration from at least one measurement of the accelerometer and at least one barometric altitude from at least one measurement of the baro-altimeter, the baro-inertial loop being configured to:

provide, from the vertical acceleration, at least one baro-inertial vertical position and the baro-inertial vertical speed, and correct the baro-inertial vertical position and the baro-inertial vertical speed from the barometric altitude and at least one position correction gain, at least one vertical speed correction gain and at least one vertical acceleration correction gain, the baro-inertial vertical position undergoing a modification due to a modification in the barometric altitude, the modification in the barometric altitude being due to a modification in local pressure, the method being implemented by the processor implementing the baro-inertial loop and comprising at least one step of limiting correction of the baro-inertial vertical speed when the absolute value of the difference between the barometric altitude and the baro-inertial vertical position is greater than a predetermined threshold, the step of limiting correction of the baro-inertial vertical speed comprising modifying the position correction gain.

2. The method according to claim 1, wherein modifying the position correction gain comprises multiplying the position correction gain by a predetermined factor greater than 1.

3. The method according to claim 2, wherein the predetermined threshold is between 3 and 9 metres, and the predetermined factor is between 2 and 4.

4. The method according to claim 3, wherein the predetermined threshold is 7 metres.

5. The method according to claim 3, wherein the predetermined factor is 3.

6. The method according to claim 1, wherein the predetermined threshold is a function of the baro-inertial altitude.

7. The method according to claim 1, wherein the position correction gain modification is performed only if the baro-inertial altitude is less than or equal to a predetermined altitude threshold.

8. The method according to claim 1, wherein the step of limiting baro-inertial vertical speed correction further comprises modifying the speed correction gain and modifying the acceleration correction gain.

9. The method according to claim 8, wherein modifying the speed correction gain comprises multiplying the speed correction gain by a first predetermined factor less than 1 and modifying the acceleration correction gain comprises multiplying the acceleration correction gain by a second predetermined factor less than 1.

10. An airborne system comprising:

a baro-altimeter, an accelerometer and a processor implementing a baro-inertial loop, the baro-inertial loop taking as an input at least one vertical acceleration from at least one measurement of the accelerometer and at least one barometric altitude from at least one measurement of the baro-altimeter, the baro-inertial loop being configured to:

provide, from the vertical acceleration, at least one altitude and at least one vertical speed, and correct the altitude and the vertical speed from the barometric altitude and from at least one position correction gain, from at least one vertical speed correction gain and from at least one vertical acceleration correction gain, the baro-inertial vertical speed undergoing a modification due to a modification in the barometric altitude, the modification in the barometric altitude being due to a modification in local pressure, wherein the processor is configured to implement the method for limiting the baro-inertial vertical speed correction according to claim 1.

11. An aircraft comprising the airborne system according to claim 10.

12. A non-transitory computer-readable recording medium comprising instructions which, when executed by a computer, cause the same to implement the method according to claim 1.

* * * * *